United States Patent
Jain et al.

(10) Patent No.: US 9,619,357 B2
(45) Date of Patent: Apr. 11, 2017

(54) HYBRID STORAGE DEVICES

(75) Inventors: Bhushan P. Jain, Pune (IN); Sri Ramanathan, Lutz, FL (US); Sandeep R. Patil, Elmsford, NY (US); Abhinay R. Nagpal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/247,943

(22) Filed: Sep. 28, 2011

(65) Prior Publication Data

US 2013/0080621 A1   Mar. 28, 2013

(51) Int. Cl.
G06F 15/173 (2006.01)
G06F 11/30 (2006.01)
G06F 9/50 (2006.01)

(52) U.S. Cl.
CPC ........ *G06F 11/3006* (2013.01); *G06F 9/5094* (2013.01); *Y02B 60/142* (2013.01)

(58) Field of Classification Search
CPC .............................. H04L 47/70; G06F 11/3006
USPC ................................................. 709/224, 226
See application file for complete search history.

(56) References Cited

U.S. PATENT DOCUMENTS

| | | | | |
|---|---|---|---|---|
| 5,881,229 A * | 3/1999 | Singh et al. | | 709/203 |
| 6,314,503 B1 * | 11/2001 | D'Errico et al. | | 711/165 |
| 7,174,379 B2 * | 2/2007 | Agarwal | | G06F 9/505 |
| | | | | 709/226 |
| 7,546,601 B2 | 6/2009 | Byrd et al. | | |
| 2003/0135609 A1 * | 7/2003 | Carlson et al. | | 709/224 |
| 2005/0055590 A1 * | 3/2005 | Farkas et al. | | 713/320 |
| 2005/0138470 A1 * | 6/2005 | Cromer et al. | | 714/22 |
| 2006/0259622 A1 * | 11/2006 | Moore | | G06F 9/505 |
| | | | | 709/226 |
| 2008/0126673 A1 * | 5/2008 | Kaneda | | 711/103 |
| 2008/0141048 A1 | 6/2008 | Palmer et al. | | |
| 2008/0183882 A1 * | 7/2008 | Flynn et al. | | 709/229 |
| 2009/0083263 A1 * | 3/2009 | Felch et al. | | 707/5 |
| 2009/0106571 A1 | 4/2009 | Low et al. | | |
| 2009/0175107 A1 * | 7/2009 | Christensen | | G11C 7/12 |
| | | | | 365/203 |
| 2009/0254660 A1 | 10/2009 | Hanson et al. | | |

(Continued)

OTHER PUBLICATIONS

La Frese, L et al., "IBM® System Storage™ DS8700™ Performance with Easy Tier®," May 2010, International Business Machines Corporation, Systems and Technology Group, pp. 1-30.

(Continued)

*Primary Examiner* — Cheikh Ndiaye
*Assistant Examiner* — Sherman Lin
(74) *Attorney, Agent, or Firm* — Zilka-Kotab, PC (57) ABSTRACT

Systems for reducing power consumption and power leakage in hybrid storage clusters is provided. More specifically, the system is for allocating an appropriate server amongst a plurality of servers in a network by identifying an application to be executed in a network, wherein the network comprises a plurality of servers configured to execute the applications, and each server further comprising a hybrid memory system; based on the application to be executed, dynamically identifying resources to execute the application based on the hybrid memory system available and the power consumption for executing the application; and dynamically allocating the application to the identified resource for execution.

20 Claims, 6 Drawing Sheets

(56) References Cited

U.S. PATENT DOCUMENTS

| | | | | |
|---|---|---|---|---|
| 2009/0265419 | A1* | 10/2009 | Branda | H04L 47/125 709/203 |
| 2009/0265568 | A1* | 10/2009 | Jackson | 713/320 |
| 2010/0030981 | A1* | 2/2010 | Cook | 711/159 |
| 2013/0151701 | A1 | 6/2013 | Jain et al. | |

OTHER PUBLICATIONS

Non-Final Office Action from U.S. Appl. No. 13/763,353 dated Feb. 20, 2014.
Final Office Action from U.S. Appl. No. 13,763,353, dated Dec. 19, 2014.
Jain et al., U.S. Appl. No. 13/763,353, filed Feb. 8, 2013.
Advisory Action from U.S. Appl. No. 13/763,353, dated Mar. 12, 2015.
Non-Final Office Action from U.S. Appl. No. 13/763,353, dated Sep. 25, 2015.
"NFS How to," from http://nfs.sourceforge.net/nfs-howto/ar01s02.html, Dec. 2011, 38 pages.
Seo et al., "Empirical Analysis on Energy Efficiency of Flash-based SSDs," HotPower, 2008, pp. 1-5.
Fujitsu, "SPARC Enterprise M3000 Architecture," Fujitsu White Paper, Feb. 2010, pp. 1-48.
Wikipedia, "eDRAM," from http://en.wikipedia.org/wiki/EDRAM, Oct. 2011, 2 pages.
Wikipedia, "Magnetoresistive random-access memory," from http://en.wikipedia.org/wiki/Magnetoresistive_Random_Access_Memory, Dec. 2011, 10 pages.
Wikipedia, "Phase-change memory," from http://en.wikipedia.org/wiki/Phase-change_memory, Oct. 2011, 8 pages.
Wikipedia, "Static random-access memory," from http://en.wikipedia.org/wiki/Static_random_access_memory, Dec. 2011, pp. 1-7.
Anonymous, "Method and System for Managing Hybrid Caches," IP.com, Apr. 2, 2010, 4 pages.
IBM, "IBM Knowledge Center," from http://www.ibm.com/support/knowledgecenter/STXKQY_4.2.0/com.ibm.spectrum.scale.v4r2.adv.doc/bl1adv_cnfs.htm, Apr. 2016, 1 page.
Notice of Allowance from U.S. Appl. No. 13/763,353, dated Jul. 28, 2016.
PNFS, "pNFS.com," retrieved from http://nfs.sourceforge.net/nfs-howto/ar01s02.html on Aug. 24, 2016, 2 pages.
Seo et al., "Empirical Analysis on Energy Efficiency of Flash-based SSDs," retrieved from http://www.usenix.org/events/hotpower08/tech/full_papers/seo/seo.pdf on Aug. 24, 2016, pp. 1-5.
Sourceforge, "What is NFS?" retrieved from http://nfs.sourceforge.net/nfs-howto/ar01s02.html on Aug. 24, 2016, 3 pages.
Wikipedia, "eDRAM," retrieved from http://en.wikipedia.org/wiki/EDRAM on Aug. 24, 2016, 2 pages.
Wikipedia, "Magnetoresistive random-access memory," retrieved from http://en.wikipedia.org/wiki/Magnetoresistive_Random_Access_Memory on Aug. 24, 2016, pp. 1-7.
Wikipedia, "Phase-change memory," retrieved from http://en.wikipedia.org/wiki/Phase-change_memory on Aug. 24, 2016, pp. 1-7.
Wikipedia, "Static random-access memory," retrieved from http://en.wikipedia.org/wiki/Static_random_access_memory on Aug. 24, 2016, pp. 1-6.
IBM, "IBM Knowledge Center," retrieved from http://www.ibm.com/support/knowledgecenter/STXKQY_4.2.0/com.ibm.spectrum.scale.v4r2.adv.doc/bl1adv_cnfs.htm on Sep. 9, 2016, 1 page.

* cited by examiner

| Area (25nm) | 3.66mm² SRAM | 3.10mm² MRAM |
|---|---|---|
| Capacity | 128KB | 512KB |
| Read latency | 2.25ns | 2.32ns |
| Write latency | 2.26ns | 11.02ns |
| Read energy | 0.90nJ | 0.86nJ |
| Write energy | 0.80nJ | 5.10nJ |

| Cache configurations | Leakage power |
|---|---|
| 2MB (16x128KB) SRAM cache | 2.05W |
| 8MB (16x512KB) MRAM cache | 0.26W |

FIG. 1A – Comparison of SRAM and MRAM

|  | SRAM | eDRAM | PRAM | MRAM |
|---|---|---|---|---|
| Density | Low | High | Very High | High |
| Speed (read) | Very fast | Fast | Slow | Fast |
| Speed (write) | Very fast | Fast | Very slow | Slow |
| Dynamic Power (read) | Low | Medium | Medium | Low |
| Dynamic Power (write) | Low | Medium | High | High |
| Leakage Power | High | Medium | Low | Low |

FIG. 1B - Characteristics of RAM technologies

FIG. 2 – Data Processing System

HYBRID STORAGE DEVICES

BACKGROUND

Embodiments of the present invention relate to a system for reducing power consumption and reducing power leakage in a grid or in clusters, specifically including hybrid devices such as hybrid storages.

Energy and load management for data centers is a still a critical issue for clients and also entities hosting such services. Management such issues pose rather complex problems since data centers typically are configured to use many different types of data storage and file sharing systems, each having their own strengths and weaknesses. Typically, data centers may use Network File Systems (NFS) and/or cloud computing paradigms, which require a load management scheme to be more efficient. However, various schemes used for load management, for example, round robin techniques, closest geographic vicinity schemes, and random location schemes, amongst other schemes, do not take into account energy management issues.

SUMMARY

Described is a system for allocating an appropriate server amongst a plurality of servers in a network by identifying an application to be executed in a network, wherein the network comprises a plurality of servers configured to execute the applications, and each server further comprising a hybrid memory system; based on the application to be executed, dynamically identifying resources to execute the application based on the hybrid memory system available and the power consumption for executing the application; and dynamically allocating the application to the identified resource for execution.

In one embodiment the network the network is at least one of a wired network, a wireless network, a grid or a cloud. In a further embodiment the hybrid memory includes at least one of a SRAM, DRAM, MRAM or PRAM. In a further embodiment dynamically identifying resources includes computing the optimal power usage for executing the application; and computing the optimal available memory to execute the application, and caching the application on the server before execution.

In a further embodiment dynamically allocating the identified resources is based on an access pattern, the access pattern is a read operation and access operations being either of a random or a sequential operation, and the access pattern is saved in a log for future retrieval or usage. In a further embodiment dynamically allocating comprises computing performance tolerance and power usage of the one or more applications on the one or more memory and selecting the at one or more memory based on the performance tolerance.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Embodiments of the present invention relates to systems and methods for reducing power consumption and power leakage in hybrid storage clusters typically by selecting memory that is most efficient or resourceful for a particular process or application or thread. Specifically, embodiments of the present invention provides systems and methods for reducing power consumption by selecting a particular cache/memory type/technology in hybrid storage clusters based on performance requirements and/or other parameters associated with an object, for example a file, application, etc. The words process(es), application(s) and/or file(s) are hereinafter used interchangeable in the embodiments disclosed below.

Embodiments the present invention provides a seamless, dynamic and intelligent selection of cache/memory type/technology to reduce the effective power consumption and/or power leakage of memory for different applications. For example, advantageously, in one embodiment the system and method is configured to minimize power leakage and maximize read and write performance, i.e., I/O performance for a client application, by selecting the most appropriate cache to serve the file, taking into consideration the performance requirements and access pattern of the file and the underlying characteristics associated with the memory technology. In this way, embodiments of the present invention provides energy management solutions for data centers by significantly lowering the cost spent on power utilized for data access from data centers and data clouds, especially when they are spread across different geographies.

It is understood that although some embodiments of this disclosure include a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
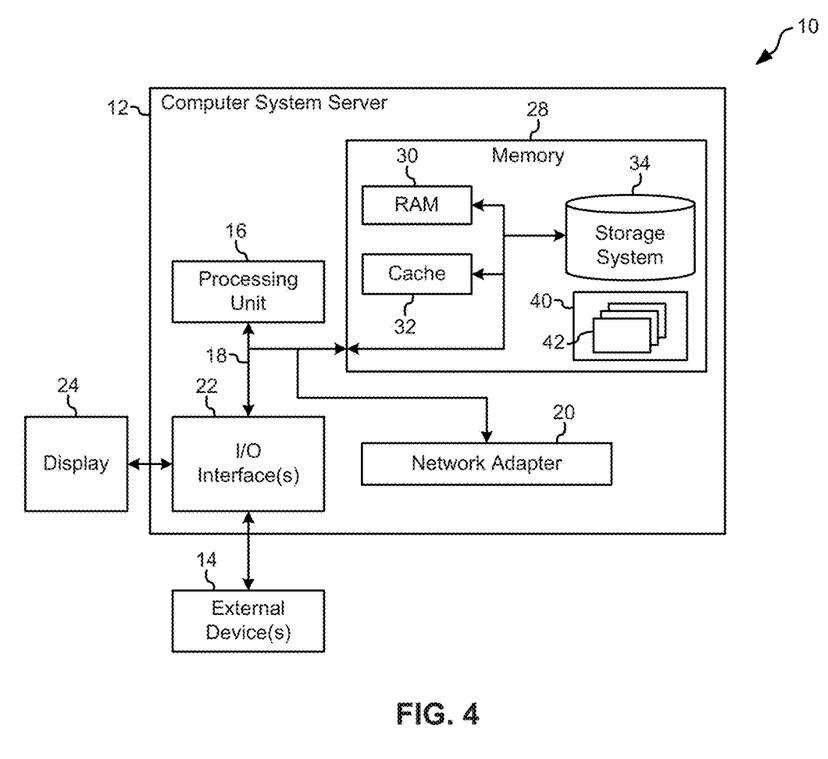
FIG. 4 depicts a cloud computing node, according to one embodiment.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
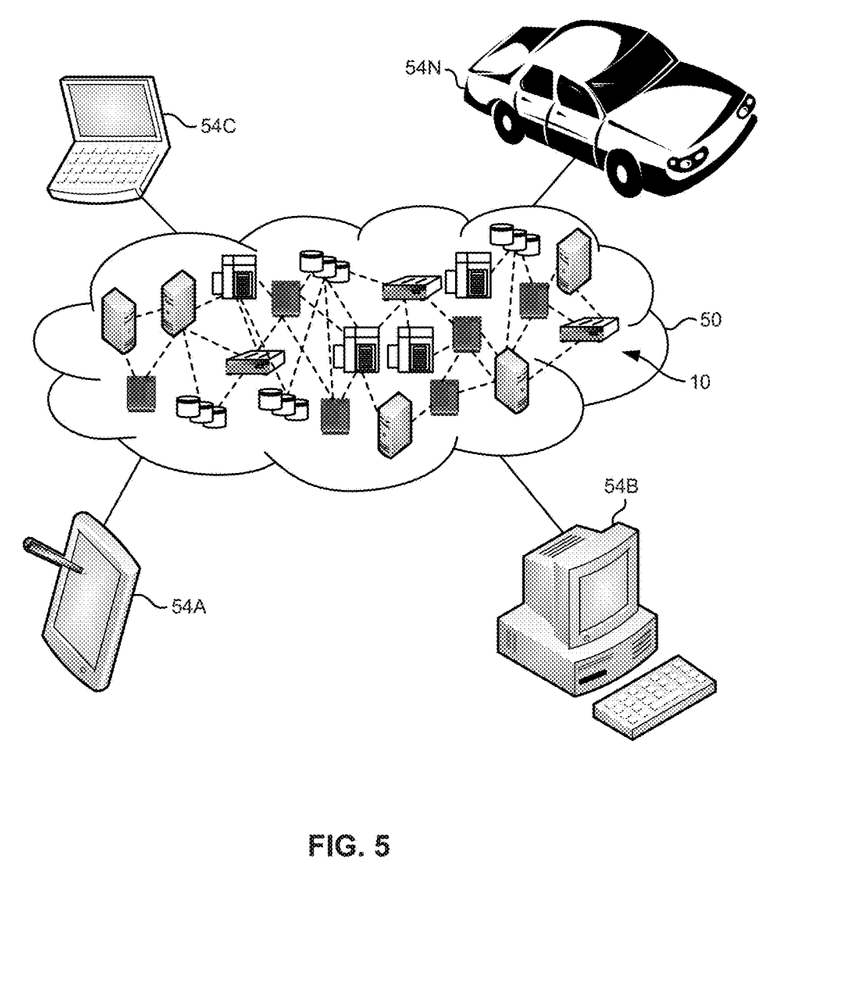
FIG. 5 depicts a cloud computing environment, according to one embodiment.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
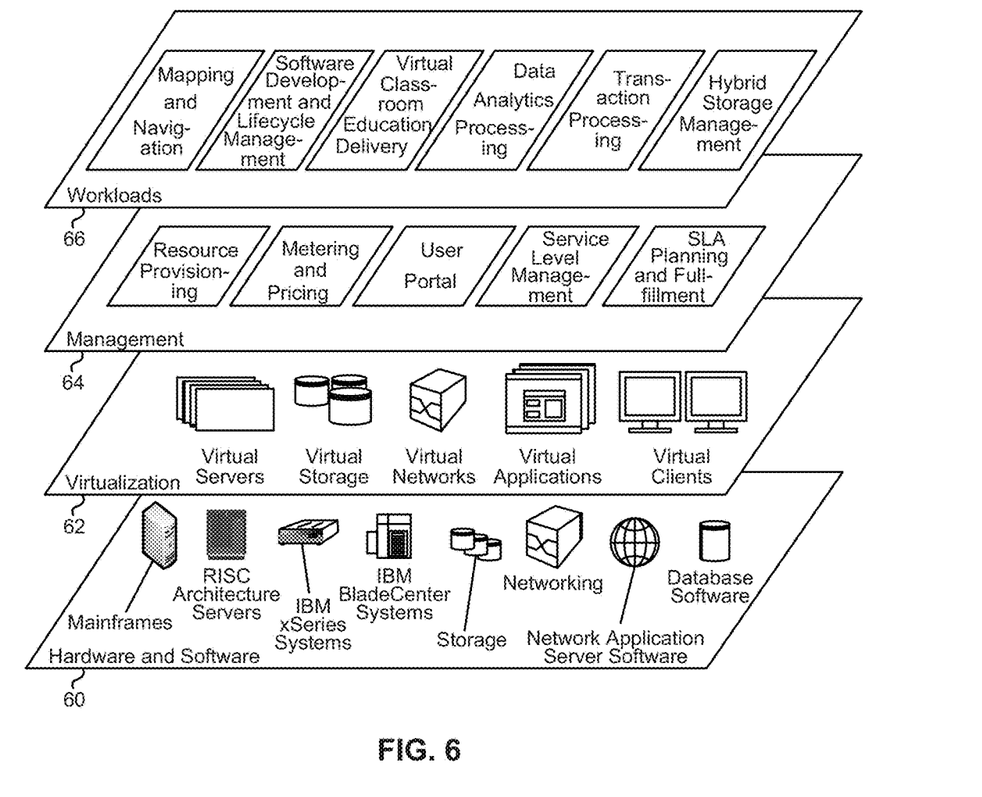
FIG. 6 depicts abstraction model layers, according to one embodiment.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; hybrid storage cluster management; etc.

Terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

There have been advances in RAM technology in the recent years, for example, newer memories, such as, Phase change Memory, may have some properties that are better but however these cannot replace existing technologies completely. Therefore, amongst other reasons, all the RAM technologies have to co-exist in the same architecture or system thereby leading to a hybrid structure. RAM technologies are discussed below in brief, in order to provide a basic understanding of such technologies, and these are generally known to a person skilled in the art.

Static Random Access Memory (SRAM) is a type of semiconductor memory that does not need to be periodically refreshed. However, semiconductor manufacturing process scaling increases leakage that becomes a disadvantage for SRAM. As a result of continued scaling of MOS transistors, power dissipation due to leakage currents increases dramatically and this becomes a source of concern especially for low power applications. However, the read and write speed over SRAM are the fastest and thus SRAM gives us the best I/O performance even though at the cost of the increased power leakage.

Embedded Dynamic Random Access Memory (eDRAM) is a capacitor-based dynamic random access memory usually integrated on the same die or in the same package as the main ASIC or processor. Capacitors have an inherent property of leaking charge, therefore the information eventually fades unless the capacitor charge is periodically refreshed. Due to this constant refresh, the power consumption as well as the power leakage are relatively high. However, this power leakage is lower than the SRAM leakage. Moreover, the I/O performance is less than that of SRAM but is better than other RAM technologies.

Phase-change memory also referred to as PCM, PRAM, PCRAM, Ovonic Unified Memory, Chalcogenide RAM, C-RAM etc., is a type of non-volatile computer memory. PRAM uses the unique behavior of chalcogenide glass, which can be "switched" between two states, i.e., the crystalline state and the amorphous state, with the application of heat. However, in such cases the contact between the hot phase-change region and the adjacent dielectric becomes a concern. For example, the dielectric may begin to leak current at higher temperature, but this power leakage is comparatively low compared to other available technologies. However, comparing the read and write speed with the other RAM technologies, it is observed that PRAM have a relatively slower I/O performance.

Magnetoresistive Random Access Memory (MRAM) stores data as electric charge or current flows using magnetic storage elements. The elements are formed from two ferromagnetic plates, each of which can hold a magnetic field, separated by a thin insulating layer. One of the two plates is a permanent magnet set to a particular polarity, and the other plate has a field which changes to match that of an external field. Since MRAM is a non-volatile memory technology, there is no power supply to each MRAM cell and hence MRAM cells do not consume any standby leakage power. Therefore, the only leakage power is the circuit leakage power for MRAM caches, which is rather low compared to the total leakage power for other caching methods. Even though the power leakage is least, the performance is not comparable with that of DRAM or SRAM. Moreover, sequential memory access requires lesser power as compared to random memory access.

For example, embodiments of the present invention can be used with a hybrid Network File System (NFS) cluster comprising servers having different types of memory or can be implemented or used with a distributed network, a cloud environment, a single server with multiple memory technologies or several servers, each having the same or different memory technologies. Hereinafter, the systems disclosed above will be referred to generally as a hybrid system, which is in general any system, such as data processing system or computing system, having different types of memories. These different types of memories include, for example, SRAM, eDRAM, PRAM and/or MRAM, amongst others.

While in operation, embodiments of the invention dynamically select the computing system with the appropriate memory, for example, SRAM or eDRAM, to serve a client application having certain characteristics that are appropriate for such memory, such as a requirement for high read and write performance. For example, in a hybrid system having multiple RAM technologies, embodiments of the present invention select the RAM technology to be used depending on the sequential or random access pattern of the client application with the ultimate goals of minimizing power consumption and power leakages. In one embodiment, the computing system may dynamically select SRAM or eDRAM memory to serve the client application having high read write performance requirement; and/or may dynamically select PRAM or MRAM memory to serve client application that can endure a relatively small performance hit to reduce power leakages and thus save energy without hampering or disturbing the functioning of the client applications.

Figure 1A:
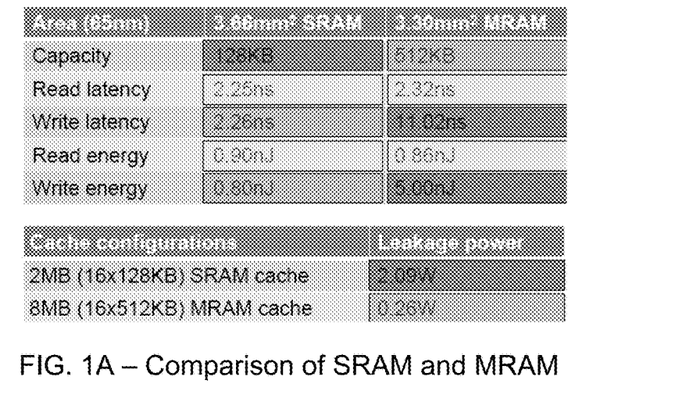
FIG. 1A illustrates an exemplary table with characteristics of SRAM and DRAM technologies used in accordance with aspects of the invention.
Figure 1B:
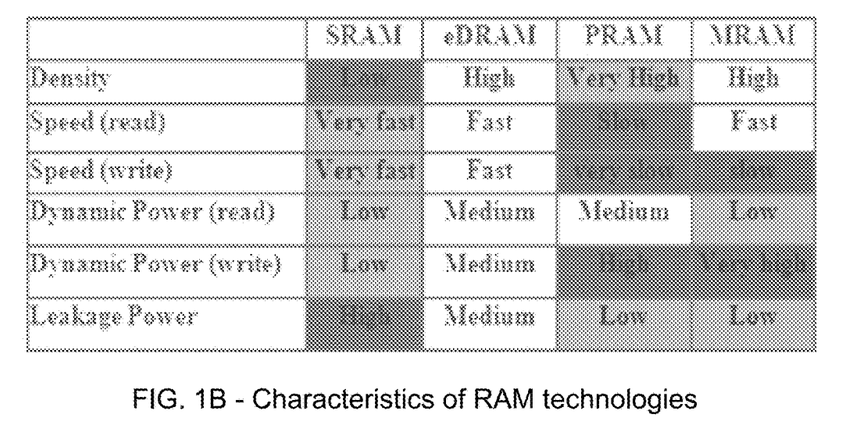
FIG. 1B illustrates an exemplary table with characteristics of various RAM technologies used in accordance with aspects of the invention.

FIGS. 1A and 1B illustrated exemplary tables showing characteristics of RAM technologies used in accordance with aspects of the invention. The tables of FIGS. 1A and 1B can be used as look-up tables stored in a storage system, for example, a database (storage 222B shown in FIG. 2). Using these tables, embodiments of the present invention can select the most efficient memory for a particular application, which will be discussed in more detail below.

FIG. 1A illustrates characteristics of SRAM compared to MRAM. More specifically, FIG. 1A shows a comparison of a 3.66 mm$^2$ SRAM against a 3.30 mm$^2$ MRAM. For example, the comparisons include, read and write latency and read and write energy. Additionally, leakage power for a 2 MB SRAM cache is compared against power leakage for an 8 MB MRAM cache. As illustrated, SRAM has the following properties—a higher density than MRAM; a faster read than MRAM; a slower write than MRAM; higher read energy than MRAM; and a lower write energy than MRAM.

Accordingly, the MRAM provides low leakage power and high density, but has a long write latency and large write energy, and the leakage power is higher for the 2 MB SRAM cache as compared to the 8 MB MRAM cache.

FIG. 1B illustrates a comparison of SRAM, eDRAM, PRAM and MRAM. More specifically, FIG. 1B shows a comparison of these memory technologies with regard a few factors such as density, speed (read), speed (write), dynamic power (read), dynamic power (write) and leakage power. The dynamic power and leakage power as illustrates are power drawn by RAM for 1 gigabyte of data. Embodiments of the present invention are capable of selecting any of these memory technologies based on the particular client application, for most power efficient usage of memory.

As will be appreciated by one skilled in the art, embodiments of the present invention may be a system, method or computer program product. Accordingly, certain embodiments of the present invention may take the form of an entirely hardware embodiment, an entirely software embodiment (including firmware, resident software, micro-code, etc.) or a combination thereof that may all generally be referred to herein as a "circuit," "module" or "system."

Furthermore, certain embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, and not limiting to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

In this context, a computer readable storage medium may be any tangible medium that contains, or stores a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination thereof. Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer for example, through the Internet using an Internet Service Provider.

Some embodiments of the present invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
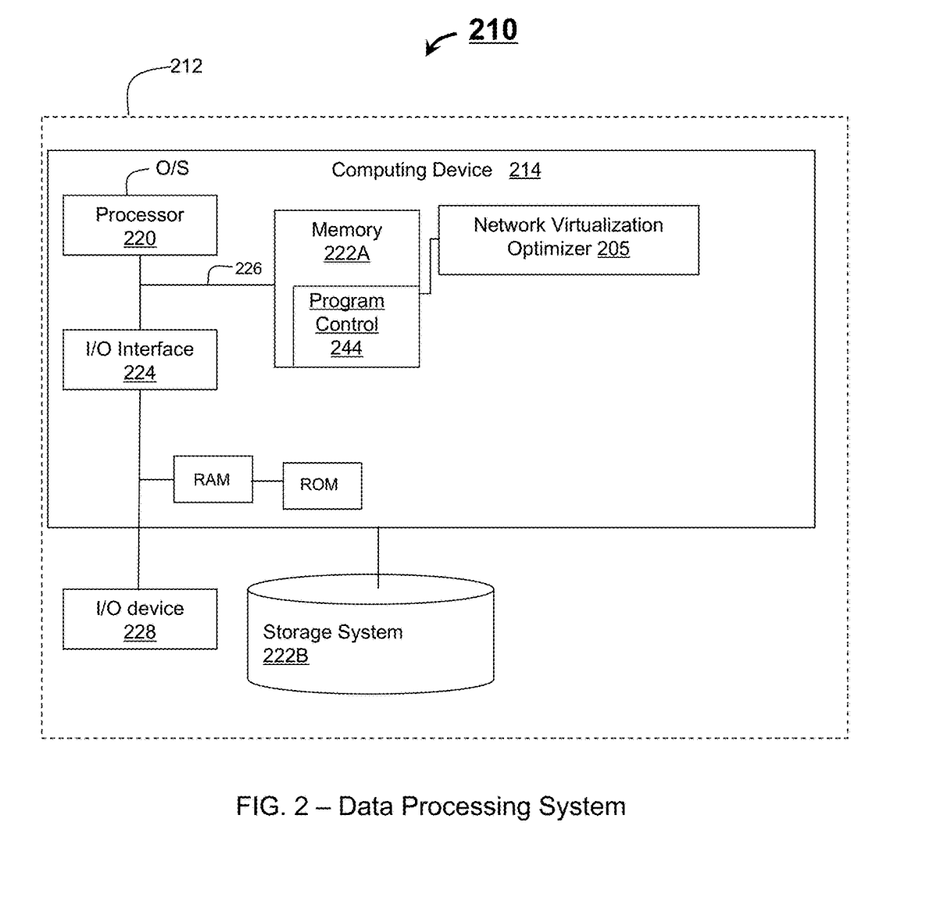
FIG. 2 illustrative exemplary environment, such as a data processing system, for implementing various aspects of the invention and the flow illustrated in FIG. 3.

FIG. 2 shows an exemplary embodiment of an environment 210 for managing the processes. The environment 210 includes a server or other computing system 212 or other data processing system 212 that can perform the processes described herein. In particular, the server 212 includes a computing device 214. The computing device 214 can be resident on a network infrastructure or computing device of a third party service provider (not shown in the Figure), The computing device 214 also includes a processor 220, memory 222A, an I/O interface 224, and a bus 226. The memory 222A can include local memory employed during actual execution of program code, bulk storage, and cache memories which provide temporary storage of at least some program code in order to reduce the number of times code must be retrieved from bulk storage during execution. In addition, the computing device includes random access memory or any other volatile memory, as discussed above, (generally referred to as RAM), a read-only memory (ROM), and an operating system (O/S).

The computing device 214 is in communication with the external I/O device/resource 228 and the storage system 222B. The computing device 214 can also be in communication with any number of hybrid systems having different types of memories, shown generally as reference numeral 225. The I/O device 228 can comprise any device that enables an individual to interact with the computing device 214, for example a user interface, or any device that enables the computing device 214 to communicate with one or more other computing devices using any type of communications link. The external I/O device/resource 228 in one embodiment may include a handheld device, PDA, handset, keyboard etc.

In general, the processor 220 executes computer program code, for example program control 244, which can be stored in the memory 222A and/or storage system 222B. While executing the computer program code, the processor 220 can read and/or write data to/from memory 222A, storage system 222B, and/or I/O interface 224. The program code executes the processes of the invention. The bus 226 provides a communications link between each of the components in the computing device 214.

In accordance with embodiments of the invention, the program control 244 controls a memory access pattern monitor and memory allocation controller. The memory access pattern monitor and memory allocation controller can be implemented as one or more program code in the program control 244 stored in memory 222A as separate or combined modules. Additionally, the memory access pattern monitor and memory allocation controller may be implemented as separate dedicated processors or a single or several processors to provide the functioning of these tools.

The memory access pattern monitor and memory allocation controller may be implemented, for example, on a system or on a client system in case of an NFS model. More specifically, the memory access pattern monitor and memory allocation controller may be used to monitor and allocate memories in any number of hybrid systems for a client application. The hybrid systems may include, for example, any combination of a single server (computing system) having multiple memory technologies, multiple servers (computing systems), each having different memory technologies or multiple memory technologies, an NFS server system, a distributed file system and/or a cloud system, each having different memory or multiple memory technologies.

In one embodiment, the memory access pattern monitor can monitor memory access patterns in any of the above hybrid systems, which have implications over the power consumption and leakage. More specifically, the memory access pattern monitor can monitor client applications to determine (or monitor) access (read/write) patterns in any of the memories of the hybrid system. The memory access pattern monitor can save the access (read/write) patterns in a log, for example database or storage 222B, for future reference of memory allocation. Even more specifically, in embodiments, the memory access pattern monitor can determine (monitor and/or track) performance tolerance and access patterns of the client applications in memories of the hybrid system, and the memory allocation controller can select the most efficient RAM technology to reduce the power leakage and/or obtain the highest (or increased) 110 performance in the hybrid systems. This RAM will be used to store the data of the applications. Thus, by implementing the present invention, it is possible to optimize, for example, the user read write performance as well as minimize the power consumption or leakage considering the constraints of the application behavior, e.g., its performance tolerance and access pattern, in any hybrid system 25.

For example, once memory access patterns are determined, e.g., read/write ratios, the memory allocation controller can determine which RAM technology, in a particular hybrid system, to use based on the memory access patterns, for most efficient power consumption. In embodiments, the memory allocation controller can access the look-up tables shown in FIGS. 1A and 1B, to make a decision as to which memory is most efficient for a particular application, based on the memory access patterns that were, for example, stored in the storage system 222b, for example as a profile history of read/write operations of an application which can be maintained in a log.

As an example, since processes performing random I/O require more power, the memory allocation controller will select RAM technologies like PRAM and MRAM for such processes performing random I/O, causing the least amount of power leakage. On the other hand, the memory allocation controller will select RAM technologies like SRAM or eDRAM for processes performing sequential I/O, even though the end result would be a higher power leakage. In this way, the eventual power leaks will be minimal as relatively lesser power will be required for sequential operations such as I/Os.

The problem of optimization of the I/O performance and power consumption or leakage based on the constraints of the RAM technology and the process behavior can be solved by a number of techniques including linear programming, implemented by, for example, the memory allocation controller or computing infrastructure of FIG. 2. As an illustrative example, the general set up of a constrained optimization is that in order to optimize the value of a function "f" [x1, x2, . . . , xn] subject to some constraints g [x1, x2, . . . , xn], to choose levels of one or more variables, [x1, x2, . . . , xn]. The function "f" is referred to as the objective function, and the set of values of the variables that satisfies the constraints is referred to as the feasible set. In embodiments, the variables to be optimized include, for example, f(x)—representing Client Read-Write Performance, and f(y)—representing Power consumption and leakage. The constraints to solve this include, for example, g(x)—representing performance tolerance and access pattern behavior of the process, and g(y)—representing available RAM (memory) technology, where g(x,y) is referred to as the constraint function. Thus, the problem to solve can be represented as the problem to optimize U=f(x,y) subject to the constraints g(x,y)=c.

To determine the critical points the Langrange's multiplier method can be used. An unknown constant, ë, known as Lagrange multiple is introduced. Since the stationary values occur when $f_x=f_y=0$, where, $f_x=\partial f/\partial x$ and $f_y=\partial f/\partial y$ which are the partial differentiation of f(x,y) with respect to x and y, respectively, the total differentiation of f(x,y) is given by $$df=f_x dx+f_y dy=0. \quad (1)$$

The total differentiation of the constraint function is given as:

$$dg=g_x dx+g_y dy=0.6 \quad (2)$$

Multiplying Eq. (1) by the constant ë and adding to Eq. (2):

$$(f_x+ëg_x)dx+(f_y+ëg_y)dy=0. \quad (3)$$

This implies that $$f_x+ëg_x=0 \quad (4)$$

$$f_y+ëg_y=0. \quad (5)$$

The required stationary points f(x,y) subject to constraints defined above can be provided by solving for the three unknowns x, y and ë. In this way, it is possible to provide or allocate the most efficient memory for a particular process, for example any of the read/write schemes. The memory allocation controller may select the most efficient RAM technologies, which in one embodiment can be based on a service level agreement, and load the applicable processes (applications/files) into the selected RAM technology of a selected hybrid system. Thus, by looking to the cache of a memory of a particular, for example computing device, to host a particular file, it becomes possible to most efficiently allocate memory, e.g., select cache for cache data for a particular application, using the characteristics of the file, e.g., sequential or random read/write operations.

Reference is made to FIG. 2, the computing device 214 may have general purpose computing article of manufacture capable of executing computer program code installed thereon (e.g., a personal computer, server, etc.). However, it is understood that the computing device 214 is only representative of various possible equivalent-computing devices that may perform the processes described herein. To this extent, in embodiments, the functionality provided by the computing device 214 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 212 is only illustrative of various types of computer infrastructures for implementing the invention. For example, in embodiments, the server 212 comprises two or more computing devices (e.g., a server cluster) that communicate over any type of communications link, such as a network, a shared memory, or the like, to perform the process described herein. Further, while performing the processes described herein, one or more computing devices on the server 212 can communicate with one or more other computing devices external to the server 212 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In embodiments, for example, using the memory allocation controller 205, the service provider can select RAM technologies based on service agreements with third parties. As an illustrative example, more efficient RAM allocation can be allocated based on high level agreements; whereas, less efficient RAM allocation can be allocated on a lower level agreement. In additional embodiments, a service provider can provide high access read rates with lower power consumption memories for a high level agreement; whereas, the service provider can provide lower access read rates with higher power consumption memories for a low level agreement.

Figure 3:
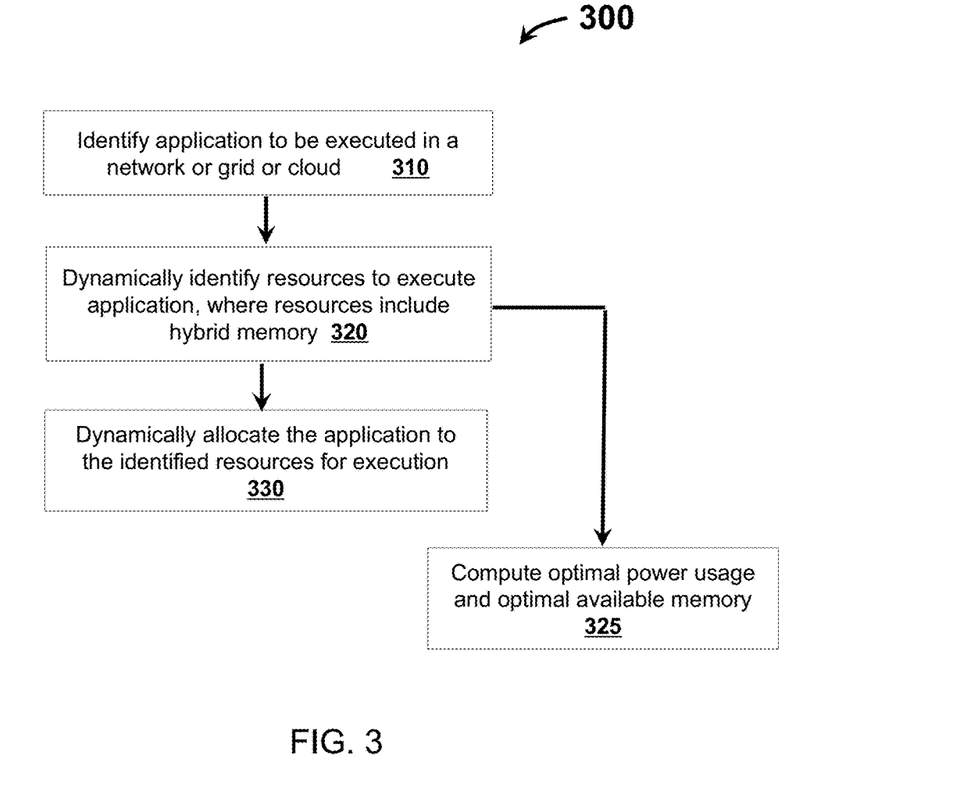
FIG. 3 illustrates an exemplary flow in accordance with various aspects of the invention.

FIG. 3 illustrates an exemplary flow that can perform the embodiments of the invention. The flowchart and block diagrams in the FIG. 3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 illustrates an exemplary flow 300 for a process in accordance with aspects of the present invention. At step 310 all applications to be executed on the network, for example the grid, or cloud are identified. In one embodiment, authenticating a user can be performed using a Lightweight Directory Access Protocol (LDAP). LDAP may hold rules associated with the client (user) such as level of service agreement. At step 320 the resources to execute the application are dynamically identified, wherein the one embodiment the resources include hybrid memories. The process computes as indicated in step 325 and inputs the expected I/O performance and power leakage of various memory technologies in different hybrid systems such as, NFS, cloud or other distributed network. This can be accomplished in one embodiment by inputting the data as look-up tables in a database such as, a storage system 222B of FIG. 2. In embodiments, these inputs can be representative of f(x) and f(y) as discussed previously. The constrain functions (g(x, y)) can be provided to the system. For example, the process determines if the application on the hybrid system is performance tolerant, if the access pattern of the process or application on the hybrid system is either sequential or random, the optimization function to maximize the I/O performance and minimize power leakage, based on the characteristics of the application, e.g., access pattern and/or performance tolerance.

The process, outputs the RAM (memory) technology to be used to achieve the performance I/O requirement with minimum power leakage. At step 330, the process dynamically allocated the application to the identified resources by selecting the server (e.g., computing system of a hybrid system) that possesses the RAM (memory) identified to serve the request, or in a given server (computing system of a hybrid system) with hybrid cache using the identified RAM (memory). The selected RAM (memory) may be assigned from for example a database, and in one embodiment can be representative of the storage system 222B of FIG. 2, which can maintain a list of severs and RAM (memory) associated with the server (e.g., computing system of a hybrid system as look up tables shown in FIGS. 1A and 1B.

Specifically, the process starts by, for example, authenticating a user using LDAP. In one embodiment, the LDAP may hold the rules associated with the client (user) such as level of service agreement. The process inputs the expected I/O performance and power leakage of various memory technologies in different hybrid systems. This can be accomplished by inputting the data represented in FIGS. 1A and 1B as look-up tables in a repository such as, for example, a storage system 222B of FIG. 2. The process is the configured to determine the access patterns of the applications. The appropriate memory based on the client service agreement and client application is selected for executing the application. The process outputs the RAM (memory) to be used to achieve the performance I/O requirement based on the service agreement, and selects the server (computing system) that possesses the RAM (memory) identified to serve the request, or in a given server (computing system) with hybrid cache using the identified RAM (memory).

This can be further classified into two groups:
(i) a group requiring a relatively high performance, and
(ii) a group that is tolerant to a performance hit.

In embodiments, the application requiring high performance can use RAM like SRAM and eDRAM which sustains high power leakage, but a disadvantage is that this is not power efficient for all applications. Instead, a more intelligent way to leverage hybrid RAM is to efficiently utilize them and find an ideal condition between power leakage and I/O performance. For example, for a performance tolerant application to ensure lower power leakage maintaining the I/O performance, PRAM and MRAM can be efficiently used.

In one embodiment, there are two applications A and B on a computing system with hybrid RAM. A has high performance requirement and B can tolerate a hit in the performance. Ideally the preference would be that both applications A and B have RAM which provides maximum performance even though this is not a strict requirement B. It is known to one skilled in the art that RAM with higher performance consume and leak more power leasing to a wastage of energy. Accordingly A can be executed on an SRAM or eDRAM (which requires high performance) and B can be executed on a PRAM or MRAM, each having a lower power footprint, and resulting in efficiently managing energy In a further embodiment, an application D accesses the memory randomly. If D uses a RAM that results in leakage of more power, because random I/O needs more power, the effective power leakage is higher. Accordingly, D can use a PRAM, over SRAM or eDRAM, thereby resulting in saving power.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system, comprising at least a processor and a memory, the system being configured to:
identify an application to be executed in a network, wherein the network comprises a plurality of servers configured to execute applications, each server having access to resources including at least a hybrid memory system;
determine a group of the application from amongst at least two groups: a first group for applications which are tolerant to reduced performance, and a second group for applications which require a relatively high performance;
determine which memories of the hybrid memory system are available to execute the application and a power consumption needed to execute the application on each available memory of the hybrid memory system;
dynamically identify one or more resources to execute the application based on all of: the group of the application, characteristics of the application, which memories of the hybrid memory system are available, an amount of leakage current that would occur during execution of the application for each available memory of the hybrid memory system, and which of the available memories are configured to execute the application with a least amount of power consumption; and
dynamically allocate the application to at least one server that has access to the one or more identified resources configured to execute the application using the one or more identified resources with the least amount of power consumption.

2. The system as recited in claim 1, wherein the hybrid memory system includes at least one of a SRAM and a DRAM, and at least one of a MRAM and a PRAM, wherein the one or more resources are identified based on an access pattern of the application, and I/O performance and power leakage for memories of the hybrid memory system, and wherein the hybrid memory system is accessible by all servers in the network.

3. The system as recited in claim 1, wherein any unavailable memories of the hybrid memory system are removed from contention when dynamically identifying the one or more resources to execute the application, and wherein the system is further configured to execute the application on the at least one server using the one or more identified resources to execute the application with the least amount of power consumption.

4. The system as recited in claim 1, wherein the system is configured to dynamically identify the resources by:
computing an optimal power usage for executing the application; and
computing an optimal available memory of the hybrid memory system to execute the application based on the optimal power usage for executing the application.

5. The system as recited in claim 1, wherein the system is further configured to utilize a lookup table having stored therein characteristics of the memories of the hybrid memory system to identify the one or more resources to execute the application.

6. The system as recited in claim 1, wherein the one or more identified resources are dynamically allocated based at least partially on an access pattern for each available memory of the hybrid memory system determined while executing the application previously.

7. The system as recited in claim 6, wherein the access pattern is saved in a log for future retrieval or usage, and wherein the access pattern comprises read/write ratios for the application.

8. The system as recited in claim 1, wherein to dynamically allocate the application to the at least one server that has access to the one or more identified resources, the system is configured to compute a performance tolerance and a power usage of the applications-on the one or more identified resources and selecting one or more memory from the one or more resources based on the performance tolerance.

9. The system as recited in claim 1, wherein one characteristic of the application is a performance tolerance that is accounted for when dynamically identifying the one or more resources to execute the application, and wherein, for a performance tolerant application, one or more resources are identified having lower power leakage than other available resources.

10. The system as recited in claim 1, wherein the system is configured to:
    utilize a lookup table having stored therein characteristics of the memories of the hybrid memory system to identify the one or more resources to execute the application, wherein the one or more resources are identified based on an access pattern of the application, and I/O performance and power leakage for memories of the hybrid memory system; and
    execute the application on the at least one server using the one or more identified resources to execute the application with the least amount of power consumption.

11. The system as recited in claim 1, wherein characteristics of the application comprise:
    a performance tolerance of the application to be executed on lower performing resources; and
    an access pattern of the application,
    wherein for a performance tolerant application, one or more resources are identified having lower power leakage than other available resources, and
    wherein for a high read write performance requirement, one or more resources are identified having faster read and write times than other available resources.

12. A computer program product, comprising a computer readable storage device having program instructions embodied therewith, the program instructions being executable by a memory allocation controller to cause the memory allocation controller to:
    identify an application to be executed in a network, wherein the network comprises a plurality of servers configured to execute applications, each server having access to resources including at least a hybrid memory system;
    determine a group of the application from amongst at least two groups: a first group for applications which are tolerant to reduced performance, and a second group for applications which require a relatively high performance;
    determine which memories of the hybrid memory system are available to execute the application and a power consumption needed to execute the application on each available memory of the hybrid memory system;
    dynamically identify one or more resources to execute the application based on all of: the group of the application, characteristics of the application, which memories of the hybrid memory system are available, an amount of leakage current that would occur during execution of the application for each available memory of the hybrid memory system, and which of the available memories are configured to execute the application with a least amount of power consumption; and
    dynamically allocate the application to at least one server that has access to the one or more identified resources configured to execute the application using the one or more identified resources with the least amount of power consumption.

13. The computer program product as recited in claim 12, wherein the hybrid memory system includes at least one of a SRAM and a DRAM, and at least one of a MRAM and a PRAM, wherein the one or more resources are identified based on an access pattern of the application, and I/O performance and power leakage for memories of the hybrid memory system, and wherein the hybrid memory system is accessible by all servers in the network.

14. The computer program product as recited in claim 12, wherein the program instructions executable by the memory allocation controller to dynamically identify the resources are further executable by the memory allocation controller to:
    compute an optimal power usage to execute the application;
    compute an optimal available memory to execute the application based on the optimal power usage to execute the application; and
    utilize a lookup table having stored therein characteristics of the memories of the hybrid memory system to identify the one or more resources to execute the application.

15. The computer program product as recited in claim 12, wherein the program instructions are further executable by the memory allocation controller to execute the application on the at least one server using the one or more identified resources to execute the application with the least amount of power consumption.

16. The computer program product as recited in claim 12, wherein the one or more identified resources are dynamically allocated based at least partially on an access pattern, wherein the access pattern comprises read/write ratios for the application.

17. The computer program product as recited in claim 16, wherein the program instructions are further executable by the memory allocation controller to:
    determine the group of the application as the second group for applications which require a relatively high performance in response to a determination that the access pattern comprises random memory read operations; and
    save the access pattern in a log for future retrieval or usage.

18. The computer program product as recited in claim 12, wherein the program instructions are further executable by the memory allocation controller to:
    utilize a lookup table having stored therein characteristics of the memories of the hybrid memory system to identify the resource to execute the application, wherein the resource is selected based on an access pattern of the application, I/O performance for memories of the hybrid memory system, and power leakage for memories of the hybrid memory system;
    select a resource within the hybrid memory system to execute the application based on the least amount of power consumption; and
    execute the application on the at least one server using the selected resource to execute the application with the least amount of power consumption.

19. The computer program product as recited in claim 12, wherein one characteristic of the application is a performance tolerance that is accounted for when dynamically identifying the one or more resources to execute the application, wherein the performance tolerance for the application is at least partially based on an access pattern of the application, and wherein, for a performance tolerant application, one or more resources are identified having lower power leakage than other available resources.

20. The computer program product as recited in claim 12, wherein the characteristics of the application comprise:
a performance tolerance of the application to be executed on lower performing resources; and
an access pattern of the application,
wherein for a performance tolerant application, one or more resources are identified having lower power leakage than other available resources, and
wherein for a high read write performance requirement, one or more resources are identified having faster read and write times than other available resources.

* * * * *